United States Patent
Hamad et al.

(10) Patent No.: US 11,325,066 B2
(45) Date of Patent: *May 10, 2022

(54) HELIUM RECOVERY FROM GASEOUS STREAMS

(71) Applicant: Saudi Arabian Oil Company, Dhahran (SA)

(72) Inventors: Feras Hamad, Dhahran (SA); Megat A. Rithauddeen, Dhahran (SA); Taib Abang, Dhahran (SA); Milind Vaidya, Dhahran (SA); Sebastien A. Duval, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 18 days.

This patent is subject to a terminal disclaimer.

(21) Appl. No.: 16/926,309

(22) Filed: Jul. 10, 2020

(65) Prior Publication Data
US 2021/0031139 A1 Feb. 4, 2021

Related U.S. Application Data

(63) Continuation of application No. 15/990,555, filed on May 25, 2018, now Pat. No. 10,765,995.
(Continued)

(51) Int. Cl.
*B01D 53/22* (2006.01)
*B01D 53/14* (2006.01)
(Continued)

(52) U.S. Cl.
CPC ........... *B01D 53/229* (2013.01); *B01D 53/04* (2013.01); *B01D 53/047* (2013.01);
(Continued)

(58) Field of Classification Search
None
See application file for complete search history.

(56) References Cited

U.S. PATENT DOCUMENTS 4,157,247 A * 6/1979 Collins, III ............ B01D 53/04
  95/93
4,466,946 A 8/1984 Goddin, Jr. et al.
(Continued)

FOREIGN PATENT DOCUMENTS

CA 2968601 6/2016
CN 101522595 9/2009
(Continued)

OTHER PUBLICATIONS

GCC Examination Report in GCC Appln. No. GC 2018-35444, dated Mar. 10, 2021, 4 pages.
(Continued)

*Primary Examiner* — Jason M Greene
(74) *Attorney, Agent, or Firm* — Fish & Richardson P.C.

(57) ABSTRACT

Recovering helium from a gaseous stream includes contacting an acid gas removal membrane with a gaseous stream to yield a permeate stream and a residual stream, removing a majority of the acid gas from the residual stream to yield a first acid gas stream and a helium depleted clean gas stream, removing a majority of the acid gas from the permeate stream to yield a second acid gas stream and a helium rich stream, and removing helium from the helium rich stream to yield a helium product stream and a helium depleted stream. A helium removal system for removing helium from a gaseous stream including hydrocarbon gas, acid gas, and helium includes a first processing zone including a first acid gas removal unit, a second processing zone including a second acid gas removal unit, a third processing zone, and a helium purification unit.

25 Claims, 7 Drawing Sheets

Related U.S. Application Data

(60) Provisional application No. 62/516,999, filed on Jun. 8, 2017.

(51) Int. Cl.
| | |
|---|---|
| B01D 53/04 | (2006.01) |
| B01D 53/047 | (2006.01) |
| B01D 53/86 | (2006.01) |
| B01D 53/26 | (2006.01) |
| B01D 53/24 | (2006.01) |
| C01B 23/00 | (2006.01) |
| C01B 17/04 | (2006.01) |
| F25J 3/02 | (2006.01) |
| C10L 3/10 | (2006.01) |

(52) U.S. Cl.
CPC ..... *B01D 53/0462* (2013.01); *B01D 53/1443* (2013.01); *B01D 53/1456* (2013.01); *B01D 53/1462* (2013.01); *B01D 53/226* (2013.01); *B01D 53/24* (2013.01); *B01D 53/26* (2013.01); *B01D 53/8612* (2013.01); *C01B 17/0404* (2013.01); *C01B 17/0456* (2013.01); *C01B 23/0042* (2013.01); *C01B 23/0094* (2013.01); *C10L 3/102* (2013.01); *F25J 3/029* (2013.01); *F25J 3/0209* (2013.01); *B01D 2256/18* (2013.01); *B01D 2256/245* (2013.01); *B01D 2257/11* (2013.01); *B01D 2257/304* (2013.01); *B01D 2257/504* (2013.01); *B01D 2257/7025* (2013.01); *B01D 2257/80* (2013.01); *C01B 2210/0006* (2013.01); *C01B 2210/007* (2013.01); *C01B 2210/0012* (2013.01); *C01B 2210/0014* (2013.01); *C01B 2210/0021* (2013.01); *C01B 2210/0025* (2013.01); *C01B 2210/0031* (2013.01); *C01B 2210/0051* (2013.01); *C01B 2210/0064* (2013.01); *C10L 2290/548* (2013.01); *F25J 2205/50* (2013.01); *F25J 2205/80* (2013.01); *F25J 2220/66* (2013.01)

(56) References Cited

U.S. PATENT DOCUMENTS

| | | | |
|---|---|---|---|
| 4,589,896 A | 5/1986 | Chen et al. | |
| 4,701,187 A | 10/1987 | Choe | |
| 4,717,407 A | 1/1988 | Choe et al. | |
| 5,401,300 A | 3/1995 | Lokhandwala et al. | |
| 5,407,466 A | 4/1995 | Lokhandwala et al. | |
| 5,407,467 A | 4/1995 | Lokhandwala et al. | |
| 5,632,803 A | 5/1997 | Stoner | |
| 5,837,032 A | 11/1998 | Moll et al. | |
| 6,179,900 B1 | 1/2001 | Behling et al. | |
| 6,361,582 B1 | 3/2002 | Pinnau et al. | |
| 6,656,249 B1* | 12/2003 | Buisman | B01D 53/52 95/195 |
| 6,896,717 B2 | 5/2005 | Pinnau et al. | |
| 8,722,003 B1 | 5/2014 | Avagliano et al. | |
| 8,828,121 B1 | 9/2014 | He et al. | |
| 10,765,995 B2* | 9/2020 | Hamad | B01D 53/229 |
| 2005/0217479 A1 | 10/2005 | Hale et al. | |
| 2010/0264014 A1 | 10/2010 | Mignon et al. | |
| 2011/0138854 A1 | 6/2011 | Huang et al. | |
| 2012/0111051 A1 | 5/2012 | Kulkarni et al. | |
| 2012/0168154 A1 | 7/2012 | Chinn et al. | |
| 2012/0323059 A1 | 12/2012 | Liu et al. | |
| 2014/0338395 A1 | 11/2014 | Oelfke et al. | |
| 2015/0231555 A1* | 8/2015 | He | B01D 53/228 95/47 |
| 2015/0240717 A1 | 8/2015 | Starcher et al. | |
| 2015/0290575 A1 | 10/2015 | Rothermel et al. | |
| 2015/0298972 A1* | 10/2015 | Ballaguet | B01D 53/229 423/575 |
| 2016/0121258 A1* | 5/2016 | First | B01D 53/047 95/139 |
| 2016/0228813 A1* | 8/2016 | Schwartz | B01D 53/229 |
| 2017/0045290 A1 | 2/2017 | Ploeger et al. | |
| 2017/0312682 A1 | 11/2017 | Keller | |
| 2017/0320736 A1* | 11/2017 | Voss | B01D 53/226 |

FOREIGN PATENT DOCUMENTS

| | | |
|---|---|---|
| CN | 103980950 | 8/2014 |
| CN | 104001408 | 8/2014 |
| EP | 684066 | 11/1995 |
| TW | I579034 | 4/2017 |
| WO | WO 2017020919 | 2/2017 |

OTHER PUBLICATIONS

Amo et al., "Low-Quality Natural Gas Sulfur Removal/Recovery," Membrane Technology and Research, DOE Report DE-AC21-92MC28133-01, Jan. 29, 1998, 107 pages.

Aschoundong et al., "Silane Modification of Cellulose Acetate Dense Films as Materials for Acid Gas Removal Macromolecules," Macromolecules, vol. 46, No. 14, Jul. 9, 2013, 11 pages.

Belov et al., "Gas transport and free volume in hexafluoropropylene polymers," Journal of Membrane Science, vol. 383, Nov. 2011, 8 pages.

Bernardo et al., "Gas transport properties of Pebax/room temperature ionic liquid gel membranes" Separation and Purification Technology vol. 97, Sep. 2012, 13 pages.

Bhide et al., "Hybrid processes for the removal of acid gases from natural gas," Journal of Membrane Science, vol. 140, Issue 1, Mar. 4, 1998, 2 pages, Abstract Only.

Chatterjee et al., "Poly(ether urethane) and poly (ether urethane urea) membranes with high $H_2S/CH_4$ selectivity," Journal of Membrane Science, vol. 135, No. 99, Nov. 1997, 8 pages.

Jansen et al., "On the unusual solvent and the effect on the gas transport in perfluorinated Hyflon AD Membranes," Journal of Membrane Science, vol. 287, Issue 1, Jan. 2007, 6 pages.

Kraftschik et al., "Dense film polyimide membranes for aggressive sour gas feed separations," Journal of Membrane Science vol. 428, Feb. 1, 2013, 12 pages.

Lallemand et al., "Extending the treatment of highly sour gases: cryogenic distillation," Digital Refining: Processing, Operations & Maintenance, Jan. 2014, 8 pages.

Lallemand et al., "Highly sour gas processing: Bulk removal with SPREX Process," IPTC-10581-MS, International Petroleum Technology Conference, Nov. 2005, 18 pages.

Lallemand et al., "Solutions for the treatment of highly sour gases," Digital Refining: Processing, Operations & Maintenance, Apr. 2012, 14 pages.

Lockhart, "Sour oil and gas management: 3.3," Volume Lii/New Developments: Energy, Transport, Sustainability Encyclopedia of Hydrocarbons, 2007, 34 pages.

Lokhandwala et al., "Membrane separation of nitrogen from natural gas: A case study from membrane synthesis to commercial deployment," Journal of Membrane Science 346, Jan. 2010, 10 pages.

Merkel and Toy, "Comparison of Hydrogen Sulfide Transport Properties in Fluorinated and Nonfluorinated Polymers," Macromolecules, vol. 3 9, No. 22, Sep. 2006, 10 pages.

Robeson, "The upper bound revisited," Journal of Membrane Science, vol. 320, Jul. 15, 2008, 11 pages.

Rufford et al., "The removal of $CO_2$ and N2 from natural gas: A review of conventional and emerging process technologies," Journal of Petroleum Science and Engineering, vol. 94-95, Sep. 2012, 32 pages.

International Search Report and Written Opinion issued in PCT/US2018/035347 dated Aug. 29, 2018, 16 pages.

International Communication (Invitation to Pay Additional Fees and, where Applicable, Protest Fees, PCT Article 17(3)(a) and Rule 40.1 and 40.2e) in International Application No. PCT/US2018/0308076 dated Sep. 28, 2018, 14 pages.

(56) References Cited

OTHER PUBLICATIONS

International Search Report and Written Opinion issued in International Application No. PCT/US/2018/038076 dated Nov. 28, 2018, 19 pages.
Gulf Cooperation Council Examination Report issued in GCC Application No. GC 2018-35500 dated Nov. 27, 2019, 5 pages.
Gulf Cooperation Council Examination Report issued in GCC Application No. GC 2018-35500 dated Mar. 4, 2020, 3 pages.
GCC Examination Report in GCC Appln, No. GC 2018-3 5444, dated Jun. 15, 2020, 5 pages.
CN Office Action in Chinese Appln. No. 201880038238.X, dated Aug. 4, 2021, 21 pages, with English Translation.
EPO Communication pursuant to Article 94(3) EPC in European Appln. No. 18732612.9, dated Jul. 9, 2021, 8 pages.
CN Office Action in Chinese Appln. No. 201880047267.2, dated Oct. 29, 2021, 13 pages, with English Translation.
EPO Communication pursuant to Article 94(3) EPC in European Appln. No. 18739682.5, dated Oct. 26, 2021, 13 pages.

* cited by examiner

Table 1. Membrane Permeance Coefficient (PI)

| Component | Membrane Permeance (GPU) | He/Gas | $H_2S$/Gas | $CO_2$/Gas |
|---|---|---|---|---|
| $CH_4$ | 1.0 | 100 | 33 | 33 |
| C2 | 0.7 | 143 | 47 | 47 |
| C3 | 0.42 | 236 | 77 | 77 |
| C4+ | 0.32 | 315 | 103 | 103 |
| $CO_2$ | 32.6 | 3.1 | 1.0 | 1.0 |
| Helium | 100 | 1.0 | 0.33 | 0.33 |
| $N_2$ | 1.5 | 67 | 22 | 22 |
| $H_2O$ | 1001 | 0.10 | 0.03 | 0.03 |
| Area (m$^2$) | 91,500 | | | |
| Hydrocarbon Slipped to Permeate | 3.9% | | | |
| Acid Gas Load Removed to Permeate | 65.8% | | | |
| He Recovered in Permeate | 91.0% | | | |

FIG. 2

Table 2. Overall Process Streams Material Balance

| | Gaseous Stream (108) | Residual Stream (114) | Permeate Stream (116) | Helium Depleted Clean Gas Stream (122) | First Acid Gas Rich Stream (120) | Helium Rich Stream (130) | Second Acid Gas Rich Stream (132) | Dehydrated Helium Rich Stream (134) | Helium Depleted Stream (140) | Water Stream (136) | Helium Product Stream (138) |
|---|---|---|---|---|---|---|---|---|---|---|---|
| Flow MMSCFD | 300.7 | 249.4 | 51.3 | 233.2 | 16.2 | 11.8 | 39.5 | 11.1 | 9.7 | 0.7 | 1.4 |
| psia | 714.7 | 714.7 | 21.6 | 714.7 | 30 | | | | | | |
| Molar Composition | | | | | | | | | | | |
| $CH_4$ | 67.8% | 78.6% | 15.6% | 84.0% | 1.2% | 67.8% | 0.01% | 72.1% | 82.2% | 0.0% | 0.58% |
| C2 | 2.6% | 3.0% | 0.4% | 3.2% | 0.0% | 1.8% | 0.00% | 1.9% | 2.2% | 0.0% | 0.02% |
| C3 | 1.5% | 1.7% | 0.5% | 1.8% | 0.0% | 2.1% | 0.00% | 2.2% | 2.5% | 0.0% | 0.02% |
| C4+ | 0.4% | 0.5% | 0.1% | 0.5% | 0.0% | 0.4% | 0.00% | 0.4% | 0.5% | 0.0% | 0.00% |
| $CO_2$ | 20.0% | 8.2% | 77.0% | 1.9% | 98.7% | 0.0% | 99.90% | 0.0% | 0.0% | 0.0% | 0.00% |
| Helium | 0.50% | 0.05% | 2.66% | 0.06% | 0.00% | 11.55% | 0.00% | 12.29% | 0.01% | 0.0% | 99.29% |
| $N_2$ | 7.0% | 7.9% | 2.4% | 8.5% | 0.0% | 10.3% | 0.00% | 11.0% | 12.5% | 0.0% | 0.09% |
| $H_2O$ | 0.2% | 0.0% | 1.4% | 0.0% | 0.0% | 6.0% | 0.00% | 0.0% | 0.0% | 100.0% | 0.00% |

FIG. 3

Table 3. Membrane Permeance Coefficients (PI) for Stage 1 and Stage 2 Units, on which the Process in First Processing Zone is Based

| Component | Membrane Permeance (GPU) | He/Gas | $H_2S$/Gas | $CO_2$/Gas |
|---|---|---|---|---|
| $CH_4$ | 1.0 | 100 | 33 | 33 |
| C2 | 0.7 | 143 | 47 | 47 |
| C3 | 0.42 | 236 | 77 | 77 |
| C4+ | 0.32 | 315 | 103 | 103 |
| $CO_2$ | 32.6 | 3.1 | 1.0 | 1.0 |
| Helium | 100 | 1.0 | 0.33 | 0.33 |
| $N_2$ | 1.5 | 67 | 22 | 22 |
| $H_2O$ | 1001 | 0.10 | 0.03 | 0.03 |
| Total Area ($m^2$) = Stage 1 + Stage 2 | | 68,000 | | |
| Hydrocarbon Slipped to Permeate | | 0.12% | | |
| Acid Gas Load Removed to Permeate | | 50.8% | | |
| He Recovered in Permeate | | 90.6% | | |
| Total Compression (MW) | | 22.9 | | |

FIG. 5

Table 4. Overall Process Streams Material Balance

| | Gaseous Stream (408) | Residual Stream (414) | Permeate Stream (416) | Helium Depleted Clean Gas Stream (422) | First Acid Gas Rich Stream (420) | Air to Reactor Furnace | Gas Stream Vented to Flare (434) | Sulfur Melt (438) | $CO_2$ Stream (446) | Water Stream (438 + 450) | Helium Depleted Stream (456) | Helium Product Stream (454) |
|---|---|---|---|---|---|---|---|---|---|---|---|---|
| Flow MMSCFD | 350.8 | 304.1 | 46.3 | 260.9 | 43.2 | 76.6 | $4.9 \times 10^{-6}$ | 26.7 | 15.4 | 30.0 | 61.32 | 0.95 |
| psia | 714.7 | 714.7 | 21.6 | 714.7 | 21.6 | 21.6 | 14.7 | 14.7 | | | | |
| | | | | | Molar Composition | | | | | | | |
| $CH_4$ | 60.6% | 69.8% | 0.6% | 81.4% | 0.0% | 0.0% | 0.0% | 0.0% | 0.0% | 0.0% | 0.0% | 0.0% |
| C2 | 1.2% | 1.3% | 0.0% | 1.6% | 0.0% | 0.0% | 0.0% | 0.0% | 0.0% | 0.0% | 0.0% | 0.0% |
| C3 | 0.8% | 0.9% | 0.0% | 1.0% | 0.0% | 0.0% | 0.0% | 0.0% | 0.0% | 0.0% | 0.0% | 0.0% |
| C4+ | 0.3% | 0.4% | 0.0% | 0.4% | 0.0% | 0.0% | 0.0% | 0.0% | 0.0% | 0.0% | 0.0% | 0.0% |
| $CO_2$ | 9.6% | 6.1% | 32.6% | 0.0% | 43.2% | 0.0% | 9.0% | 0.0% | 99.9% | 0.0% | 0.0% | 0.0% |
| $H_2S$ | 15.4% | 8.1% | 63.8% | 0.0% | 56.8% | 0.0% | 2.1% | 0.0% | 0.0% | 0.0% | 0.0% | 0.0% |
| Helium | 0.3% | 0.0% | 2.1% | 0.0% | 0.0% | 0.0% | 1.2% | 0.0% | 0.0% | 0.0% | 0.0% | 99.94% |
| $N_2$ | 11.6% | 13.3% | 0.1% | 15.5% | 0.0% | 80.0% | 81.5% | 0.0% | 0.0% | 0.0% | 100.0% | 0.06% |
| $H_2O$ | 0.2% | 0.0% | 0.9% | 0.0% | 0.0% | 0.0% | 5.3% | 1.8% | 0.0% | 99.9% | 0.0% | 0.0% |
| $O_2$ | 0.0% | 0.0% | 0.0% | 0.0% | 0.0% | 20.0% | 0.0% | 0.0% | 0.0% | 0.0% | 0.0% | 0.0% |
| $SO_2$ | 0.0% | 0.0% | 0.0% | 0.0% | 0.0% | 0.0% | 0.8% | 0.0% | 0.1% | 0.0% | 0.0% | 0.0% |
| S | 0.0% | 0.0% | 0.0% | 0.0% | 0.0% | 0.0% | 0.0% | 98.2% | 0.0% | 0.0% | 0.0% | 0.0% |

FIG. 6

HELIUM RECOVERY FROM GASEOUS STREAMS

CLAIM OF PRIORITY

This application is a continuation of and claims the benefit of priority to U.S. patent application Ser. No. 15/990,555, filed on May 25, 2018, which claims priority to U.S. Patent Application Ser. No. 62/516,999, filed on Jun. 8, 2017, the entire contents of which are hereby incorporated by reference.

TECHNICAL FIELD

This disclosure relates to removing helium from a gaseous stream containing hydrocarbon gas, acid gas, and helium, such as a natural gas stream.

BACKGROUND

Helium may be recovered from a natural gas stream. For a natural gas stream with a high loading of acid gas, a conventional acid gas removal process to remove carbon dioxide and hydrogen sulfide may be preceded by a membrane process, with hydrocarbon gas, acid gas, and helium in the natural gas stream separated into a low pressure permeate stream and a high pressure residual stream. The low pressure permeate stream, rich in acid gas, is typically provided to a sulfur recovery unit. The high pressure residual stream, lean in acid gas, is usually subjected to a conventional acid gas removal process, such as an amine absorption process, and followed by a helium recovery process. Thus, helium recovery is limited by the amount of helium in the residual stream.

SUMMARY

This disclosure describes methods and systems for helium recovery from gaseous streams containing hydrocarbon gas, acid gas, and helium.

In a first general aspect, recovering helium from a gaseous stream includes contacting an acid gas removal membrane with a gaseous stream. The gaseous stream includes hydrocarbon gas, acid gas, and helium. Contacting the acid gas removal membrane with the gaseous stream separates the gaseous stream into a permeate stream and a residual stream, the permeate stream and the residual stream each including a portion of the hydrocarbon gas, a portion of the acid gas, and a portion of the helium. A concentration of the helium in the permeate stream is greater than a concentration of the helium in the residual stream. The first general aspect also includes removing a majority of the acid gas from the residual stream to yield a first acid gas stream and a helium depleted clean gas stream. A concentration of acid gas in the first acid gas stream is greater than a concentration of acid gas in the helium depleted clean gas stream. The first general aspect also includes removing a majority of the acid gas from the permeate stream to yield a second acid gas stream and a helium rich stream. A concentration of acid gas in the second acid gas stream is greater than a concentration of acid gas in the helium rich stream. The first general aspect also includes removing helium from the helium rich stream to yield a helium product stream and a helium depleted stream. A concentration of helium in the helium product stream is greater than a concentration of helium in the helium depleted stream.

Implementations of the first general aspect may include one or more of the following features.

The acid gas may include at least one of carbon dioxide and hydrogen sulfide.

The permeance of the acid gas removal membrane for acid gas and helium is greater than the permeance of the acid gas removal membrane for hydrocarbon gas and nitrogen.

A concentration of the helium in the helium product stream is greater than a concentration of the helium in the gaseous stream.

A concentration of hydrogen sulfide in the helium depleted clean gas stream is 4 ppmv or less.

A concentration of carbon dioxide in the helium depleted clean gas stream is 2 mol % or less.

Removing the majority of the acid gas from the residual stream includes contacting a second acid gas removal membrane with the residual stream or treating the residual stream via liquid-based absorption process, a distillation process, an adsorption process, or a molecular centrifuge process. Removing the majority of the acid gas from the residual stream may include an adsorption process, such as a pressure swing adsorption process or a temperature swing adsorption process. Removing the majority of the acid gas from the residual stream may include a liquid-based absorption process, such as an amine absorption process, a hot potassium absorption process, a mixed solvent absorption process, or a physical solvent absorption process.

The first acid gas stream includes hydrogen sulfide, and the first acid gas stream is treated to yield sulfur and a tail gas. Hydrogen sulfide may be removed from the tail gas.

Removing a majority of the acid gas from the permeate stream may include removing carbon dioxide, hydrogen sulfide, or both from the permeate stream. Removing the majority of the acid gas from the permeate stream may include contacting a third acid gas removal membrane with the permeate stream.

Water may be removed from the helium rich stream to yield a dehydrated helium rich stream and a water stream. Removing water from the helium rich stream may include contacting the helium rich stream with ethylene glycol, silica gel, or a molecular sieve.

The helium product stream may be purified to yield a purified helium product stream. The purified helium product stream may include at least 1 mol %, 5 mol %, 10 mol %, 15 mol %, 20 mol %, 25 mol %, 30 mol %, 35 mol %, 40 mol %, 45 mol %, 50 mol %, 60 mol %, 70 mol %, 75 mol %, 80 mol %, 85 mol %, 90 mol %, 95 mol %, 98 mol %, 99 mol %, 99.5, mol %, 99.9 mol %, 99.99 mol %, or 99.999 mol % helium. Purifying the helium product stream may include contacting the helium product stream with a molecular sieve, subjecting the helium product stream to an adsorption process or a molecular centrifuge process, or distilling the helium product stream. Purifying the helium product stream may include subjecting the helium product stream to an adsorption process, such as a pressure swing adsorption process or a temperature swing adsorption process. Purifying the helium product stream may include at least one of removing hydrocarbon gas from the helium product stream, removing nitrogen gas from the helium product stream, and rectifying the helium in the helium product stream. Rectifying the helium may include cryogenic distillation of the helium product stream.

A concentration of helium in the helium product stream may be greater than a concentration of helium in the gaseous stream.

Sulfur, water, or both may be recovered from the gaseous stream.

The helium product stream may include at least 10% (mol) of the helium in the gaseous stream.

In a second general aspect, a helium removal system for removing helium from a gaseous stream including hydrocarbon gas, acid gas, and helium includes a first processing zone having a first acid gas removal unit configured to separate a gaseous stream into a residual stream and a permeate stream. The residual stream and the permeate stream each includes a portion of the hydrocarbon gas, a portion of the acid gas, and a portion of the helium, and a concentration of the helium in the permeate stream is greater than a concentration of the helium in the residual stream. The helium removal system further includes a second processing zone fluidly coupled to the first processing zone and including a second acid gas removal unit configured to receive the residual stream from the first processing zone and to remove a majority of the acid gas from the residual stream, thereby yielding a first acid gas rich stream and a helium depleted clean gas stream. A concentration of acid gas in the first acid gas rich stream is greater than concentration of acid gas in the helium depleted clean gas stream. The helium removal system further includes a third processing zone fluidly coupled to the first processing zone and including: a third acid gas removal unit configured to receive the permeate stream from the first processing zone and to remove a majority of the acid gas from the permeate stream, thereby yielding a second acid gas rich stream and a helium rich stream; and a helium purification unit fluidly coupled to the third acid gas removal unit and configured to receive the helium rich stream and to recover a majority of the helium from the helium rich stream, thereby yielding a helium depleted stream and a helium product stream. A concentration of acid gas in the second acid gas rich stream is greater than a concentration of acid gas in the helium rich stream, and a concentration of helium in the helium product stream is greater than a concentration of helium in the helium depleted stream.

Implementations of the second general aspect may include one or more of the following features.

The first acid gas removal unit includes an acid gas removal membrane, and the permeance of the acid gas removal membrane for acid gas and helium is greater than the permeance of the acid gas removal membrane for hydrocarbon gas and nitrogen gas.

The second acid gas removal unit and the third acid gas removal unit may each independently include a liquid-based absorption process unit, a molecular centrifuge unit, an adsorption process unit, or a distillation process. The liquid-based absorption process unit may include an amine absorption process unit, a hot potassium absorption process unit, a mixed solvent absorption process unit, or a physical solvent absorption process. The adsorption process unit may include a pressure swing adsorption process unit or temperature swing adsorption unit.

The helium removal system may include a sulfur removal unit fluidly coupled to the third acid gas removal unit and configured to receive the second acid gas rich stream. The sulfur removal unit may include a unit configured to oxidize hydrogen sulfide to yield sulfur dioxide, and to react hydrogen sulfide and sulfur dioxide to yield sulfur. The sulfur removal unit may include a unit configured to remove hydrogen sulfide via catalytic conversion and amine absorption.

The third processing zone may include a dehydration unit fluidly coupled to the third acid gas removal unit and the helium purification unit and configured to remove water from the helium rich stream, thereby yielding a dehydrated helium rich stream and a water stream. The helium purification unit may be configured to receive the dehydrated helium rich stream from the dehydration unit. The dehydration unit may include ethylene glycol, silica gel, or a molecular sieve.

The helium purification unit may include a helium absorption unit, a helium adsorption unit, a molecular centrifuge unit, or a helium distillation unit. The helium purification unit may include a helium adsorption unit, and the helium adsorption unit may include a molecular sieve. The helium purification unit may include a helium adsorption unit, and the helium adsorption unit may include a pressure swing adsorption unit or a temperature swing adsorption unit. The helium purification unit may include a helium distillation unit, and the helium distillation unit may include a cryogenic distillation unit.

The details of one or more implementations of the subject matter described in this specification are set forth in the accompanying drawings and the following description. Other features, aspects, and advantages of the subject matter will become apparent from the description, the drawings, and the claims.

BRIEF DESCRIPTION OF THE DRAWINGS

FIG. 2 is a table listing membrane properties for the acid gas removal membrane of Example 1.

FIG. 3 is a table listing material balance of the process streams in Example 1.

FIG. 5 is a table listing membrane properties for the acid gas removal membranes of Example 2.

FIG. 6 is a table listing material balance of the process streams in Example 2.

DETAILED DESCRIPTION

This specification describes systems and methods for helium recovery from gaseous streams containing hydrocarbon gas, acid gas, and helium. In one embodiment, the gaseous stream is a natural gas stream. At least one of the concentration of acid gas in the gaseous stream and the loading of acid gas in the gaseous stream may exceed the maximum concentration or loading, respectively, suitable for removal by a single process, such as an amine absorption process. Helium recovery systems and processes described in this specification can reduce acid gas content to a level that conventional acid gas removal processes can handle, and advantageously allow for recovery of an increased amount of helium from gaseous streams with a high acid gas loading at a low cost due at least in part to the reduced processing capacity needed.

Figure 1:
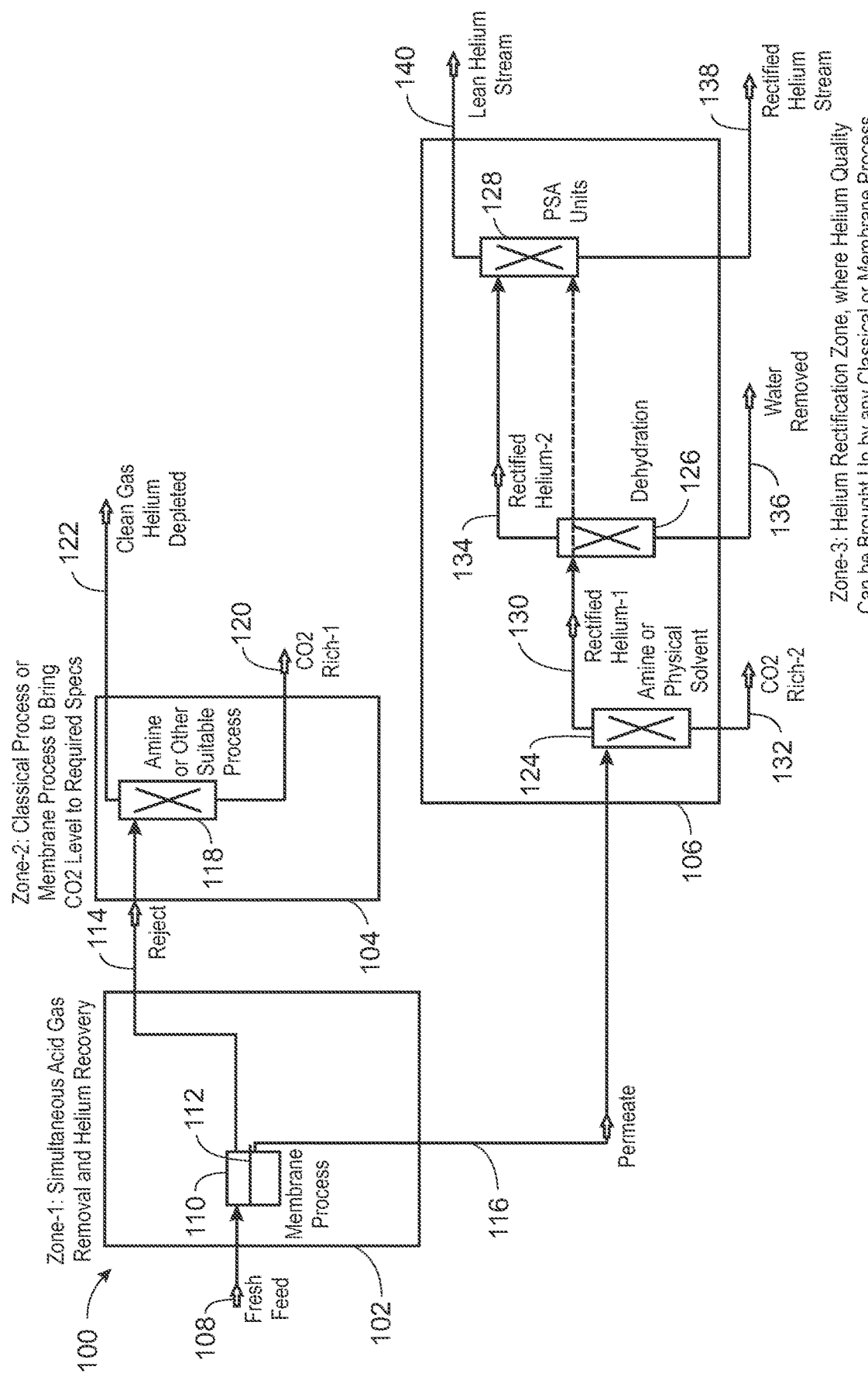
FIG. 1 depicts an exemplary system for helium recovery from a gaseous stream containing hydrocarbon gas, acid gas, and helium.

FIG. 1 depicts an exemplary system 100 for recovering helium from a gaseous stream. System 100 includes first processing zone 102, second processing zone 104, and third processing zone 106. Second processing zone 104 and third processing zone 106 are fluidly coupled to first processing zone 102. Gaseous stream 108 from which helium is to be recovered enters system 100 via first processing zone 102.

Gaseous stream 108 includes hydrocarbon gas, acid gas, and an inert gas, such as helium and nitrogen gas. In one embodiment, gaseous stream 108 is a natural gas stream. The hydrocarbon gas includes methane, and may include ethane, propane, butanes, pentanes, and higher molecular weight hydrocarbons. The acid gas includes carbon dioxide, hydrogen sulfide, or both. In one embodiment, a majority of the acid gas is carbon dioxide. In another embodiment, a majority of the acid gas is hydrogen sulfide. A gas that includes a "majority" of a particular component includes greater than 50 mol % of that component. In some embodiments, a gas that includes a majority of a particular component includes greater than 60 mol %, greater than 70 mol %, greater than 80 mol %, greater than 90 mol %, greater than 95 mol %, greater than 98 mol %, or greater than 99 mol % of that component. In some embodiments, gaseous stream 108 can include up to 90 mol % of one or more acid gases (for example, up to 90 mol % of carbon dioxide, hydrogen sulfide, or both).

First processing zone 102 includes first acid gas removal unit 110 having acid gas removal membrane 112. Acid gas removal membrane 112 is contacted with gaseous stream 108 in first acid gas removal unit 110 to separate gaseous stream 108 into residual stream 114 and permeate stream 116. Residual stream 114 and permeate stream 116 each includes a portion of the hydrocarbon gas, a portion of the acid gas, and a portion of the helium from gaseous stream 108. Residual stream 114 is a high pressure stream that is lean in acid gas and helium. Permeate stream 116 is a low pressure stream that is rich in acid gas and helium. The concentration of the acid gas in permeate stream 116 is greater than the concentration of the acid gas in gaseous stream 108 and residual stream 114. The concentration of helium in permeate stream 116 is greater than the concentration of helium in gaseous stream 108 and residual stream 114.

Acid gas removal membrane 112 is an acid gas selective membrane with a bulk removal capacity for acid gas. In some embodiments, acid gas removal membrane 112 includes a glassy polymer, and helium permeates acid gas removal membrane 112 faster than acid gases. In certain embodiments, acid gas removal membrane 112 allows for simultaneous removal of acid gas and recovery of helium from gaseous stream 108. Acid gas removal membrane 112 is typically a polymeric membrane including one or more polymeric materials such as cellulose acetate, polyimides, and perfluorinated polyimides. In some embodiments, acid gas removal membrane 112 is a facilitated transport membrane or a supported ionic liquid membrane. Acid gas removal membrane 112 may be a one-stage, two-stage, or multi-stage membrane. The permeance of acid gas removal membrane 112 for acid gas and helium is greater than the permeance of the acid gas removal membrane for hydrocarbon gas and certain other gases, such as nitrogen gas. The permeance of acid gas removal membrane 112 for water is typically higher than the permeance of the acid gas removal membrane for acid gas and helium.

Second processing zone 104 is fluidly coupled to first processing zone 102. Residual stream 114 from first processing zone 102 is processed in second processing zone 104. Second processing zone 104 includes second acid gas removal unit 118. Second acid gas removal unit 118 receives residual stream 114 from first acid gas removal unit 110 and removes a majority of the acid gas from residual stream 114, yielding first acid gas rich stream 120 and helium depleted clean gas stream 122. The concentration of acid gas in first acid gas rich stream 120 is greater than the concentration of acid gas in helium depleted clean gas stream 122.

In one embodiment, second acid gas removal unit 118 includes an acid gas removal membrane, such as that described with respect to acid gas removal membrane 112. Removing a majority of the acid gas from residual stream 114 includes contacting the acid gas removal membrane in second acid gas removal unit 118 with residual stream 114 to yield first acid gas rich stream 120 and helium depleted clean gas stream 122. Removing a majority of the acid gas from residual stream 114 may include removing carbon dioxide, hydrogen sulfide, or both from residual stream 114. In one embodiment, second acid gas removal unit 118 includes a liquid-based absorption process unit, such as an amine absorption process unit, and removing a majority of the acid gas from residual stream 114 includes treating residual stream 114 in the liquid-based absorption process unit to yield first acid gas rich stream 120 and helium depleted clean gas stream 122. In one embodiment, second gas removal unit 118 includes a hot potassium process unit, and removing a majority of the acid gas from residual stream 114 includes treating residual stream 114 in the hot potassium process unit to yield first acid gas rich stream 120 and helium depleted clean gas stream 122. In one embodiment, second acid gas removal unit 118 includes an adsorption unit, and removing a majority of the acid gas from residual stream 114 includes treating residual stream 114 in the adsorption unit to yield first acid gas rich stream 120 and helium depleted clean gas stream 122. In some embodiments, the adsorption unit is a pressure swing adsorption unit, and treating residual stream 114 in the pressure swing adsorption unit includes subjecting residual stream 114 to a pressure swing adsorption process. In one embodiment, second gas removal unit 118 includes a molecular centrifuge unit, and removing a majority of the acid gas from residual stream 114 includes treating residual stream 114 in the molecular centrifuge unit to yield first acid gas rich stream 120 and helium depleted clean gas stream 122.

In some embodiments, first acid gas rich stream 120 is further processed (for example, in second processing zone 104) to separate carbon dioxide from hydrogen sulfide. In one embodiment, first acid gas rich stream 120 is provided to a sulfur recovery unit to recover sulfur from hydrogen sulfide. Recovering sulfur from hydrogen sulfide may include subjecting first acid gas rich stream 120 to a Claus process. A tail gas from the Claus process may be subjected to a Shell Claus off-gas treating (SCOT) process, using catalytic conversion and amine absorption processes downstream of a Claus unit, to remove hydrogen sulfide traces and claim carbon dioxide in a separate stream.

In some embodiments, a concentration of hydrogen sulfide in helium depleted clean gas stream 122 is 4 parts per million by volume (ppmv) or less, and a concentration of carbon dioxide in helium depleted clean gas stream 122 is 2 mol % or less. In certain embodiments, helium depleted clean gas stream 122 is further processed (for example, in second processing zone 104) to achieve a concentration of hydrogen sulfide of 4 ppmv or less, a concentration of carbon dioxide of 2 mol % or less, or both. In one embodiment, helium depleted clean gas stream 122 is further processed in the dehydration unit to remove water, yielding a dehydrated helium depleted clean gas stream and a water stream. In some embodiments, further processing helium depleted clean gas stream 122 to remove water includes contacting helium depleted clean gas stream 122 with ethylene glycol or silica gel. Helium depleted clean gas stream 122 or the dehydrated helium depleted clean gas stream may be used for power generation or provided to Natural Gas Liquids removal unit, or to a sales gas network.

Third processing zone 106 is fluidly coupled to first processing zone 102. Permeate stream 116 from first processing zone 102 is processed in third processing zone 106. Permeate stream 116 can be processed in parallel with or in series with residual stream 114.

In one embodiment, third processing zone 106 includes third acid gas removal unit 124, dehydration unit 126, and helium purification unit 128. Third acid gas removal unit 124, which may be an acid gas removal unit such as that described with respect to second acid gas removal unit 118, receives permeate stream 116 from first processing zone 102 and removes a majority of acid gas from permeate stream 116, yielding helium rich stream 130 and second acid gas rich stream 132. A concentration of acid gas in second acid gas rich stream 132 is greater than a concentration of acid gas in helium rich stream 130. Second acid gas rich stream 132 may be treated, separately or together with first acid gas rich stream 120, as described with respect to second processing zone 104. Dehydration unit 126 receives helium rich stream 130 and removes water from helium rich stream 130, yielding dehydrated helium rich stream 134 and water stream 136. In some embodiments, dehydration unit 126 includes ethylene glycol, silica gel, or a molecular sieve and removing water from helium rich stream 130 includes contacting the ethylene glycol, silica gel, or a molecular sieve with helium rich stream 130. Helium purification unit 128 receives dehydrated helium rich stream 134.

In one embodiment, third processing zone 106 includes third acid gas removal unit 124 and helium purification unit 128. That is, third processing zone 106 optionally includes dehydration unit 126. If third processing zone 106 does not include a dehydration unit, helium purification unit 128 is fluidly coupled to third acid gas removal unit 124, and receives helium rich stream 130 directly from third acid gas removal unit 124. Helium purification unit 128 recovers a majority of the helium from helium rich stream 130 or dehydrated helium rich stream 134, yielding helium product stream 138 and helium depleted stream 140, which may be dehydrated. A concentration of helium in helium product stream 138 is greater than a concentration of helium in helium depleted stream 140.

In one embodiment, recovering a majority of helium from helium rich stream 130 or dehydrated helium rich stream 134 includes contacting helium rich stream 130 or dehydrated helium rich stream 134 with an adsorbent material such as a molecular sieve or a HELIUM SPONGE™. In one embodiment, recovering a majority of the helium from helium rich stream 130 or dehydrated helium rich stream 134 includes subjecting helium rich stream 130 or dehydrated helium rich stream 134 to an adsorption process, such as a pressure swing adsorption process, utilizing an adsorbent material. In one embodiment, recovering a majority of the helium from helium rich stream 130 includes distilling helium rich stream 130 or dehydrated helium rich stream 134 via a process such as a cryogenic distillation process. In one embodiment, recovering a majority of the helium from helium rich stream 130 or dehydrated helium rich stream 134 includes removing at least one of hydrocarbon gas and nitrogen gas from helium rich stream 130 or dehydrated helium rich stream 134. In one embodiment, recovering a majority of the helium from helium rich stream 130 or dehydrated helium rich stream 134 includes treating helium rich stream 130 or dehydrated helium rich stream 134 in a molecular centrifuge unit. In one embodiment, recovering a majority of the helium from helium rich stream 130 or dehydrated helium rich stream 134 includes rectifying the helium in helium rich stream 130 or dehydrated helium rich stream 134.

A concentration of helium in helium product stream 138 is greater than the concentration of helium in gaseous stream 108. In one embodiment, helium product stream 138 includes at least 10 mol % of the helium in gaseous stream 108. In some embodiments, helium product stream 138 is at least 1 mol %, 5 mol %, 10 mol %, 15 mol %, 20 mol %, 25 mol %, 30 mol %, 35 mol %, 40 mol %, 45 mol %, 50 mol %, 60 mol %, 70 mol %, 75 mol %, 80 mol %, 85 mol %, 90 mol %, 95 mol %, 98 mol %, 99 mol %, 99.5, mol %, 99.9 mol %, 99.99 mol %, or 99.999 mol % helium.

In some embodiments, a concentration of hydrogen sulfide in helium depleted stream 140 is 4 ppmv or less, and a concentration of carbon dioxide in helium depleted stream 140 is 2 mol % or less. In certain embodiments, helium depleted stream 140 may be further processed (for example, in third processing zone 106) as described with respect to helium depleted clean gas stream 122 to achieve a concentration of hydrogen sulfide of 4 ppmv or less, a concentration of carbon dioxide of 2 mol % or less, or both. In some embodiments, when helium depleted stream 140 includes hydrocarbon gas, helium depleted stream 140 may, separately or together with helium depleted clean gas stream 122, be used for power generation or provided to a sales gas network.

Example 1

Gaseous stream 108 is a fresh feed (natural gas) stream having a high concentration of carbon dioxide. That is, gaseous stream 108 typically does not require hydrogen sulfide polishing. With reference to system 100, acid gas removal unit 110 removes a majority of the carbon dioxide from gaseous stream 108, yielding residual stream 114 and permeate stream 116. Residual stream 114 is provided to second processing zone 104 and permeate stream 116 is provided to third processing zone 106 in parallel. Residual stream 114 is treated in second processing zone 104 as described with respect to FIG. 1 to remove acid gas and polish the carbon dioxide content down to a target level, such as 2 mol % or less, in helium depleted clean gas stream 122. Permeate stream 116, rich in carbon dioxide and including a majority of the helium from gaseous stream 108, is treated in third processing zone 106 as described with respect to FIG. 1. The rectification of helium in helium rich stream 130 or dehydrated helium rich stream 134 into a higher grade helium stream includes removing carbon dioxide by one or more processes described with respect to second acid gas removal unit 118, removing water via dehydration unit 126 as needed, and processing in helium purification unit 128 to remove hydrocarbon gas, nitrogen gas, or both.

Simulations were performed based on the gaseous stream and process flow described in this example using a membrane process simulator integrated in Aspen HYSYS for a polyimide acid gas removal membrane (one-stage membrane process) in first acid gas removal unit 110 having the membrane properties listed in Table 1 (FIG. 2). Table 1 lists membrane permeance of various gases in Gas Permeance Units (GPU: $3.349 \times 10^{-13}$ kmol/(s·m²·Pa)). and membrane selectivity towards helium (He), hydrogen sulfide ($H_2S$), and carbon dioxide ($CO_2$) with respect to other gases under the headings He/Gas, $H_2S$/Gas, $CO_2$/Gas as permeance factor ratios, with permeance factor equal to a volume of gas permeating the membrane per area per time per partial pressure difference. The indicated area (m²) is the total membrane area needed to treat the gaseous stream and achieve separation into residual and permeate streams.

Table 2 (FIG. 3) lists material balance of the overall process streams in this example, along with the corresponding reference numbers from FIG. 1. As indicated in Table 2, the gaseous stream (300.7 million standard cubic feet of gas per day (MMSCFD)) is separated into a residual stream (249.4 MMSCFD) and a permeate stream (51.3 MMSCFD). The dehydrated helium rich stream is free of carbon dioxide and water (0.00 mol %), and includes 12.29 mol % helium. After purification, the helium product stream is 99.29 mol % helium, less than 0.7 mol % organic components, and less than 0.1 mol % nitrogen.

Figure 4:
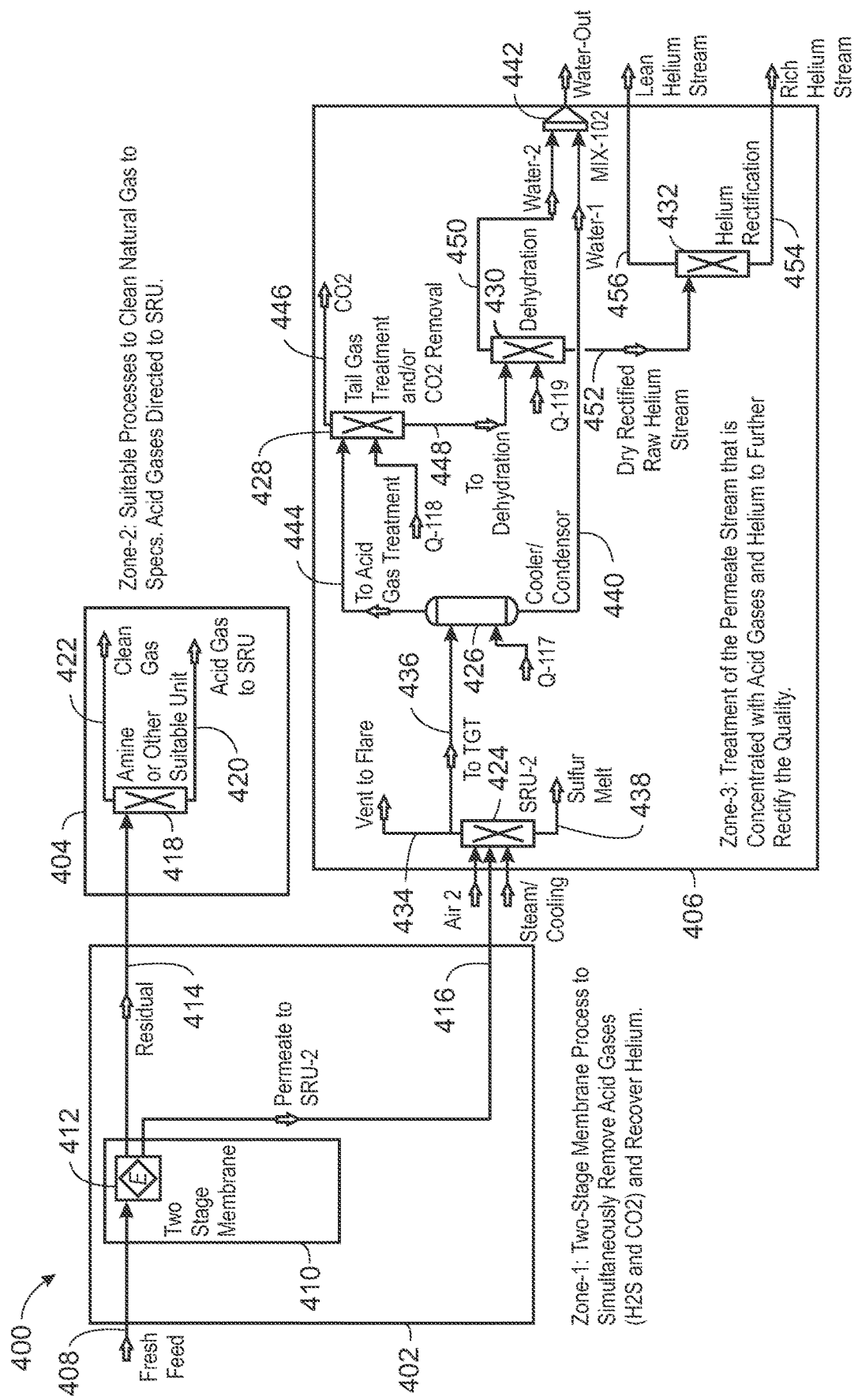
FIG. 4 depicts an exemplary system for helium recovery from a gaseous stream containing hydrocarbon gas, acid gas, and helium.

FIG. 4 depicts an exemplary system 400 for recovering helium from a gaseous stream. System 400 includes first processing zone 402, second processing zone 404, and third processing zone 406. Second processing zone 404 and third processing zone 406 are fluidly coupled to first processing zone 402. Gaseous stream 408 from which helium is to be recovered enters system 400 via first processing zone 402. Gaseous stream 408 includes hydrocarbon gas, acid gas, and an inert gas, such as helium and nitrogen gas. In one embodiment, gaseous stream 408 is a natural gas stream. The hydrocarbon gas includes methane, and may include ethane, propane, butanes, pentanes, and higher molecular weight hydrocarbons. The acid gas includes carbon dioxide, hydrogen sulfide, or both. In one embodiment, a majority of the acid gas is carbon dioxide. In another embodiment, a majority of the acid gas is hydrogen sulfide. In some embodiments, gaseous stream includes up to 90 mol % of one or more acid gases.

First processing zone 402 includes first acid gas removal unit 410 having acid gas removal membrane 412. Acid gas removal membrane 412 is contacted with gaseous stream 408 in first acid gas removal unit 410 to separate gaseous stream 408 into residual stream 414 and permeate stream 416. Residual stream 414 and permeate stream 416 each includes a portion of the hydrocarbon gas, a portion of the acid gas, and a portion of the helium from gaseous stream 408. Residual stream 414 is a high pressure stream that is lean in acid gas and helium. Permeate stream 416 is a low pressure stream that is rich in acid gas and helium. The concentration of the acid gas in permeate stream 416 is greater than the concentration of the acid gas in gaseous stream 408 and residual stream 414. The concentration of helium in permeate stream 416 is greater than the concentration of helium in gaseous stream 408 and residual stream 414.

Acid gas removal membrane 412 is an acid gas selective membrane with a bulk removal capacity for acid gas. In some embodiments, acid gas removal membrane 412 includes a glassy polymer, and helium permeates acid gas removal membrane 412 faster than acid gases. In certain embodiments, acid gas removal membrane 412 allows for simultaneous removal of acid gas and recovery of helium from gaseous stream 408. Acid gas removal membrane 412 is typically a polymeric membrane including one or more polymeric materials such as cellulose acetate, polyimides, and perfluorinated polyimides. In some embodiments, acid gas removal membrane 412 is a facilitated transport membrane or a supported ionic liquid membrane. Acid gas removal membrane 412 may be a one-stage, two-stage, or multi-stage membrane. The permeance of acid gas removal membrane 412 for acid gas and helium is greater than the permeance of the acid gas removal membrane for hydrocarbon gas and certain other gases, such as nitrogen gas. The permeance of acid gas removal membrane 412 for water is typically higher than the permeance of the acid gas removal membrane for acid gas and helium.

Second processing zone 404 is fluidly coupled to first processing zone 402. Residual stream 414 from first processing zone 402 is processed in second processing zone 404. Second processing zone 404 includes second acid gas removal unit 418. Second acid gas removal unit 418 receives residual stream 414 from first acid gas removal unit 410 and removes a majority of the acid gas from residual stream 414, yielding first acid gas rich stream 420 and helium depleted clean gas stream 422. The concentration of acid gas in first acid gas rich stream 420 is greater than the concentration of acid gas in helium depleted clean gas stream 422.

In one embodiment, second acid gas removal unit 418 includes an acid gas removal membrane, such as that described with respect to acid gas removal membrane 412. Removing a majority of the acid gas from residual stream 414 includes contacting the acid gas removal membrane in second acid gas removal unit 418 with residual stream 414 to yield first acid gas rich stream 420 and helium depleted clean gas stream 422. Removing a majority of the acid gas from residual stream 414 may include removing carbon dioxide, hydrogen sulfide, or both from residual stream 414. In one embodiment, second acid gas removal unit 418 includes a liquid-based absorption process unit, such as an amine absorption process unit, and removing a majority of the acid gas from residual stream 414 includes treating residual stream 414 in the liquid-based absorption process unit to yield first acid gas rich stream 420 and helium depleted clean gas stream 422. In one embodiment, second gas removal unit 418 includes a hot potassium process unit, and removing a majority of the acid gas from residual stream 414 includes treating residual stream 414 in the hot potassium process unit to yield first acid gas rich stream 420 and helium depleted clean gas stream 422. In one embodiment, second acid gas removal unit 418 includes an adsorption unit, and removing a majority of the acid gas from residual stream 414 includes treating residual stream 414 in the adsorption unit to yield first acid gas rich stream 420 and helium depleted clean gas stream 422. In some embodiments, the adsorption unit is a pressure swing adsorption unit, and treating residual stream 414 in the pressure swing adsorption unit includes subjecting residual stream 414 to a pressure swing adsorption process. In one embodiment, second gas removal unit 418 includes a molecular centrifuge unit, and removing a majority of the acid gas from residual stream 418 includes treating residual stream 414 in the molecular centrifuge unit to yield first acid gas rich stream 420 and helium depleted clean gas stream 422.

In some embodiments, first acid gas rich stream 420 is further processed (for example, in second processing zone 404) to separate carbon dioxide from hydrogen sulfide. In one embodiment, first acid gas rich stream 420 is provided to a sulfur recovery unit to recover sulfur from hydrogen sulfide. Recovering sulfur from hydrogen sulfide may include subjecting first acid gas rich stream 420 to a Claus process. A tail gas from the Claus process may be subjected to a Shell Claus off-gas treating (SCOT) process, using catalytic conversion and amine absorption processes downstream of a Claus unit, to remove hydrogen sulfide traces and claim carbon dioxide in a separate stream.

In some embodiments, a concentration of hydrogen sulfide in helium depleted clean gas stream 422 is 4 ppmv or less, and a concentration of carbon dioxide in helium depleted clean gas stream 422 is 2 mol % or less. In certain embodiments, helium depleted clean gas stream 422 is further processed (for example, in second processing zone 404) to achieve a concentration of hydrogen sulfide of 4 ppmv or less, a concentration of carbon dioxide of 2 mol % or less, or both. In one embodiment, helium depleted clean gas stream 422 is further processed in the dehydration unit to remove water, yielding a dehydrated helium depleted clean gas stream and a water stream. In some embodiments, further processing helium depleted clean gas stream 422 to remove water includes contacting helium depleted clean gas stream 422 with ethylene glycol or silica gel. Helium depleted clean gas stream 422 or the dehydrated helium depleted clean gas stream may be used for power generation or provided to a sales gas network.

Third processing zone 406 is fluidly coupled to first processing zone 402. Permeate stream 416 from first processing zone 402 is processed in third processing zone 406. Permeate stream 416 can be processed in parallel with residual stream 414.

In one embodiment, third processing zone 406 includes sulfur removal unit (SRU) 424, cooler or condenser unit 426, tail gas treatment or carbon dioxide removal unit 428, dehydration unit 430, and helium purification unit 432. SRU 424 receives permeate stream 416 from first processing zone 402 and removes a majority of sulfur from permeate stream 416, yielding gas stream 434, helium rich stream 436 that is lean or free from sulfur, and sulfur melt 438. Gas stream 434 typically includes small amounts of sulfurous compounds such as $H_2S$ and $SO_2$ or elemental sulfur vapors, and may be vented to flare. Cooler or condenser unit 426 receives helium rich stream 436 that is hot and saturated with water vapor. Water from cooler or condenser unit 426 exits third processing zone 406 as first water stream 440. In some cases, first water stream 440 is collected in reservoir 442 before exiting third processing zone 406. Helium rich stream 444 from cooler or condenser unit 426 is provided to tail gas treatment or carbon dioxide removal unit 428. Tail gas treatment or carbon dioxide removal unit 428 yields carbon dioxide stream 446 and a helium rich stream 448 that is a rectified raw helium stream. Dehydration unit 430 receives raw helium rich stream 448 and removes additional water from helium rich stream 448, yielding second water stream 450 and dehydrated helium rich stream 452. In some embodiments, dehydration unit 430 includes ethylene glycol, silica gel, or a molecular sieve, and removing water from treated helium rich stream 448 includes contacting the ethylene glycol, silica gel, or a molecular sieve with treated helium rich stream 448. In some embodiments, second water stream 450 exits third processing zone 406 directly. In some embodiments, second water stream 450 is collected in reservoir 442 before exiting third processing zone 406. Dehydrated helium rich stream 452 is provided to helium purification unit 432. Helium purification unit 432 processes dehydrated helium rich stream 452, yielding helium product stream 454 and helium depleted stream 456.

In one embodiment, recovering a majority of helium from dehydrated helium rich stream 452 includes contacting dehydrated helium rich stream 452 with an adsorbent material such as a molecular sieves. In one embodiment, recovering a majority of the helium from dehydrated helium rich stream 452 includes subjecting dehydrated helium rich stream 452 to an adsorption process, such as a pressure swing adsorption process, utilizing an adsorbent material. In one embodiment, recovering a majority of the helium from dehydrated helium rich stream 452 includes distilling dehydrated helium rich stream 452 via a process such as a cryogenic distillation process. In one embodiment, recovering a majority of the helium dehydrated helium rich stream 452 includes removing at least one of hydrocarbon gas and nitrogen gas from dehydrated helium rich stream 452. In one embodiment, recovering a majority of the helium from dehydrated helium rich stream 452 includes treating dehydrated helium rich stream 452 in a molecular centrifuge unit. In one embodiment, recovering a majority of the helium from dehydrated helium rich stream 452 includes rectifying the helium in dehydrated helium rich stream 452.

A concentration of helium in helium product stream 454 is typically greater than the concentration of helium in gaseous stream 408. In one embodiment, helium product stream 454 includes at least 10 mol % of the helium in gaseous stream 408. In some embodiments, a concentration of helium in helium product stream 454 is at least 1 mol %, 5 mol %, 10 mol %, 15 mol %, 20 mol %, 25 mol %, 30 mol %, 35 mol %, 40 mol %, 45 mol %, 50 mol %, 60 mol %, 70 mol %, 75 mol %, 80 mol %, 85 mol %, 90 mol %, 95 mol %, 99 mol %, 99.5, mol %, 99.9 mol %, 99.99 mol %, or 99.999 mol % helium.

In some embodiments, a concentration of hydrogen sulfide in helium depleted stream 456 is 4 ppmv or less, and a concentration of carbon dioxide in helium depleted stream 456 is 2 mol % or less. In certain embodiments, helium depleted stream 456 may be further processed (for example, in third processing zone 406) as described with respect to helium depleted clean gas stream 422 to achieve a concentration of hydrogen sulfide of 4 ppmv or less, a concentration of carbon dioxide of 2 mol % or less, or both. In some embodiments, when helium depleted stream 456 includes hydrocarbon gas, helium depleted stream 456 may, separately or together with helium depleted clean gas stream 422, be used for power generation or provided to a sales gas network.

Example 2

Gaseous stream 408 is a fresh feed (natural gas) stream having a high concentration of acid gas, including both carbon dioxide and hydrogen sulfide. That is, gaseous stream 408 typically requires deep hydrogen sulfide polishing. With reference to system 400, acid gas removal unit 410, which has a two-stage acid gas removal membrane to minimize slippage of hydrocarbons into the permeate stream, removes a majority of the acid gas and the helium from gaseous stream 408, yielding residual stream 414, lean in acid gas and helium, and permeate stream 416, rich in acid gas and helium. Residual stream 414 is provided to second processing zone 404 and permeate stream 416 is provided to third processing zone 406 in parallel. Residual stream 414 is treated in second processing zone 404 as described with respect to FIG. 4 to remove acid gas and polish the carbon dioxide and hydrogen sulfide contents down to target levels, such as 2 mol % or less and 4 ppmy or less, respectively, in helium depleted clean gas stream 422. Permeate stream 416, concentrated in carbon dioxide and hydrogen sulfide and including a majority of the helium from gaseous stream 408, is treated in third processing zone 406 as described with respect to FIG. 4. The rectification of helium in dehydrated helium rich stream 452 into a higher grade helium stream includes removing carbon dioxide and hydrogen sulfide by a process such as a sulfur recovery process and a SCOT process to meet the specifications of the flare or stack gas before release. The helium in dehydrated helium rich stream 452 is processed in helium purification unit 432 to remove hydrocarbon gas, nitrogen gas, or both, thereby yielding helium product stream 454 and helium depleted stream 456.

Simulations were performed based on the gaseous stream and process flow described in this example using a membrane process simulator integrated in Aspen HYSYS for a polyimide acid gas removal membrane (two-stage membrane process) in first acid gas removal unit 410 having membrane properties listed in Table 3 (FIG. 5) for both stages. Table 3 lists membrane permeance of various gases in GPU ($3.349 \times 10^{-13}$ kmol/(s·m²·Pa)) and membrane selectivity towards helium (He), hydrogen sulfide ($H_2S$), and carbon dioxide ($CO_2$) with respect to other gases under the headings He/Gas, $H_2S$/Gas, $CO_2$/Gas as permeance factor ratios, with permeance factor equal to a volume of gas permeating the membrane per area per time per pressure difference. The indicated area (m²) is the total membrane area needed to treat the gaseous stream and achieve separation into residual and permeate streams. Any resulting water stream will typically require sour water treatment before further use.

Table 4 (FIG. 6) lists material of the overall process streams in this example, along with the corresponding reference numbers from FIG. 4. As indicated in Table 4, gaseous stream 408 (350.8 MMSCFD) is separated into residual stream 414 (304.1 MMSCFD) and permeate stream 416 (21.6 MMSCFD) after passing through both stages of the two-stage acid gas removal membrane. Helium depleted stream 456 is 100 mol % nitrogen gas. After purification, helium product stream 454 is 99.94 mol % helium, and is essentially free of carbon dioxide and hydrogen sulfide.

Figure 7:
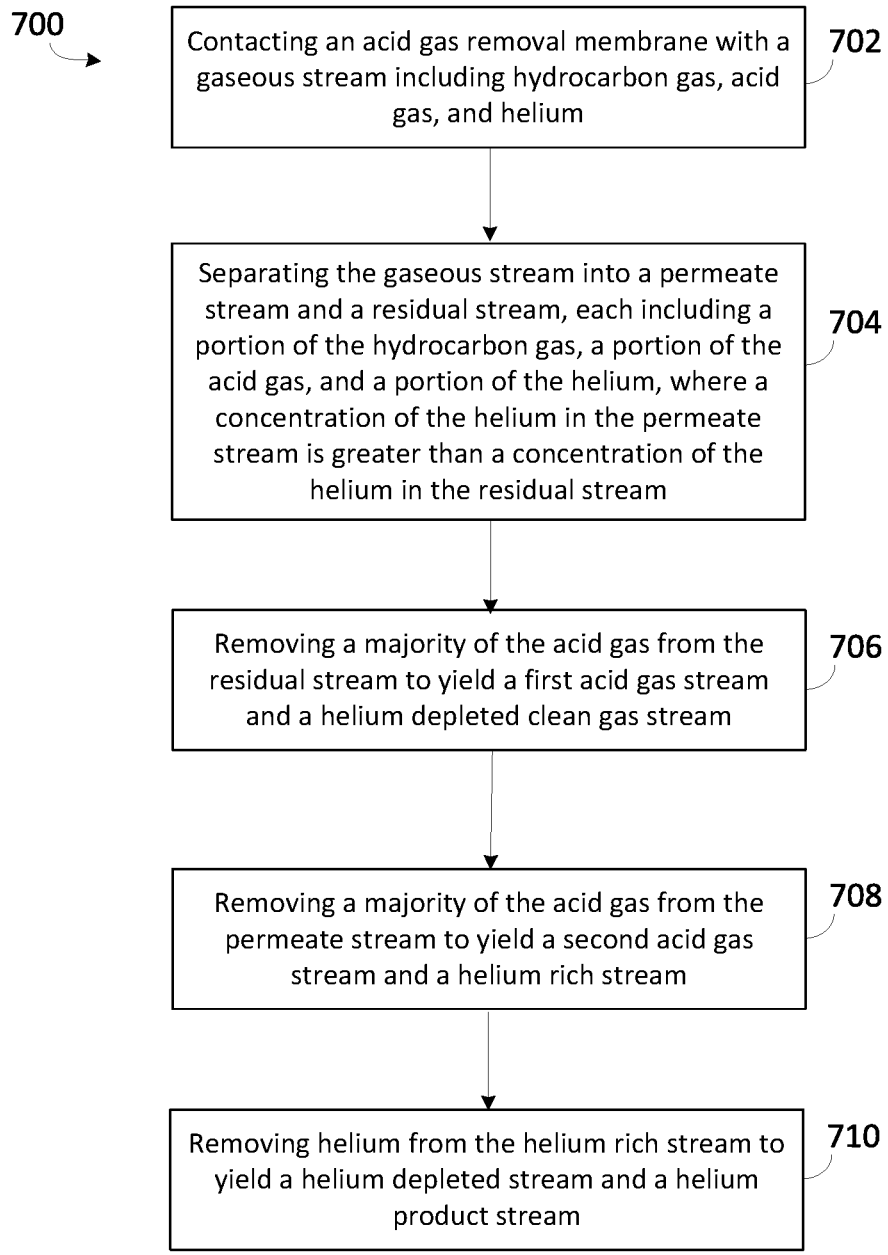
FIG. 7 is a flowchart of an exemplary method for removing helium from a gaseous stream including hydrocarbon gas, acid gas, and helium.

FIG. 7 is a flowchart of an exemplary method 700 for removing helium from a gaseous stream including hydrocarbon gas, acid gas, and inert gases such as helium and nitrogen gas. In some embodiments, method 700 is implemented by system 100 as described with respect to FIG. 1 or system 400 as described with respect to FIG. 4. At 702, an acid gas removal membrane is contacted with a gaseous stream including hydrocarbon gas, acid gas, and inert gases including helium and nitrogen gas. The acid gas removal membrane may be similar to acid gas removal membrane 112 describe with respect to FIG. 1 or acid gas removal membrane 412 described with respect to FIG. 4. The gaseous stream can be a natural gas stream with high concentration, loading, or both of acid gas, such as carbon dioxide, hydrogen sulfide, or both.

At 704, the acid gas removal membrane separates the gaseous stream into a residual stream and a permeate stream, each including a portion of the hydrocarbon gas, the acid gas, and the helium from the gaseous stream. A concentration of acid gas in the permeate stream is greater than a concentration of acid gas in the residual stream, and a concentration of helium in the permeate stream is greater than a concentration of helium in the residual stream.

At 706, a majority of the acid gas is removed from the residual stream to yield a first acid gas stream and a helium depleted clean gas stream. Removing a majority of the acid gas from the residual stream may be achieved as described with respect to second processing zone 104 in FIG. 1 or second processing zone 404 in FIG. 4.

At 708, a majority of the acid gas is removed from the permeate stream to yield a second acid gas stream and a helium rich stream. Removing a majority of the acid gas from the permeate stream may be achieved as described with respect to third processing zone 106 in FIG. 1 or third processing zone 406 in FIG. 4.

At 710, helium is removed from the helium rich stream to yield a helium depleted stream and a helium product stream. Removing helium from the helium rich stream may be achieved as described with respect to third processing zone 106 in FIG. 1 or third processing zone 406 in FIG. 4.

Thus, particular implementations of the subject matter have been described. Other implementations are within the scope of the claims.

What is claimed is:

1. A helium recovery method comprising:
    contacting an acid gas removal membrane with a gaseous stream comprising hydrocarbon gas, acid gas, and helium, thereby separating the gaseous stream into a permeate stream and a residual stream, each comprising a portion of the hydrocarbon gas, a portion of the acid gas, and a portion of the helium, wherein concentration of the helium in the permeate stream is greater than concentration of the helium in the residual stream, and wherein concentration of the acid gas in the permeate stream is greater than concentration of the acid gas in the residual stream;
    removing a majority of the acid gas from the residual stream to yield a first acid gas stream and a helium depleted clean gas stream, wherein concentration of acid gas in the first acid gas stream is greater than concentration of acid gas in the helium depleted clean gas stream; and
    removing a majority of the acid gas from the permeate stream to yield a second acid gas stream and a helium rich stream, wherein concentration of acid gas in the second acid gas stream is greater than concentration of acid gas in the helium rich stream, and wherein removing the majority of the acid gas to yield the helium rich stream does not comprise pressure swing adsorption.

2. The method of claim 1, wherein the acid gas comprises at least one of carbon dioxide or hydrogen sulfide, and wherein removing the majority of the acid gas from the permeate stream to yield the second acid gas stream and the helium rich stream comprises treating the permeate stream via a liquid-based absorption process comprising an amine absorption process, a hot potassium absorption process, a mixed solvent absorption process, or a physical solvent absorption process.

3. The method of claim 1, wherein concentration of hydrogen sulfide in the helium depleted clean gas stream is 4 ppmv or less, and wherein concentration of carbon dioxide in the helium depleted clean gas stream is 2 mol % or less.

4. The method of claim 1, wherein removing the majority of the acid gas from the residual stream to yield the first acid gas stream does not comprise contacting a second acid gas removal membrane with the residual stream.

5. The method of claim 1, wherein removing the majority of the acid gas from the residual stream to yield the first acid gas stream comprises treating the residual stream via distillation or a molecular centrifuge.

6. The method of claim 1, wherein removing the majority of the acid gas from the residual stream to yield the first acid gas stream comprises treating the residual stream via a liquid-based absorption process or an adsorption process, wherein the adsorption process is a pressure swing adsorption process or a temperature swing adsorption process, and wherein the liquid-based absorption process is an amine absorption process, a hot potassium absorption process, a mixed solvent absorption process, or a physical solvent absorption process.

7. The method of claim 1, wherein the first acid gas stream comprises hydrogen sulfide, and wherein the method comprises treating the first acid gas stream to yield sulfur and a tail gas and removing hydrogen sulfide from the tail gas.

8. The method of claim 1, comprising removing hydrocarbon gas and nitrogen gas from the helium rich stream, wherein a second acid gas removal unit and a third acid gas removal unit each independently comprises a liquid-based absorption process unit, a molecular centrifuge unit, a temperature swing adsorption process unit, or a distillation process unit.

9. The method of claim 1, comprising processing the helium rich stream to yield a helium product stream having a concentration of helium of at least 90 mol %.

10. The method of claim 1, comprising recovering sulfur and water from the gaseous stream, wherein removing the majority of the acid gas from the permeate stream to yield the second acid gas stream and the helium rich stream comprises treating the permeate stream via a liquid-based absorption process, a temperature swing adsorption process, or a molecular centrifuge process.

11. A helium removal system for removing helium from a gaseous stream comprising hydrocarbon gas, acid gas, and helium, the helium removal system comprising:
a first processing zone comprising a first acid gas removal unit to separate the gaseous stream into a residual stream and a permeate stream, each comprising a portion of the hydrocarbon gas, a portion of the acid gas, and a portion of the helium, wherein concentration of the helium in the permeate stream is greater than concentration of the helium in the residual stream, and wherein concentration of the acid gas in the permeate stream is greater than concentration of the acid gas in the residual stream;
a second processing zone fluidly coupled to the first processing zone and comprising a second acid gas removal unit to receive the residual stream from the first processing zone and remove a majority of the acid gas from the residual stream, thereby yielding a first acid gas rich stream and a helium depleted clean gas stream, wherein concentration of acid gas in the first acid gas rich stream is greater than concentration of acid gas in the helium depleted clean gas stream; and
a third processing zone fluidly coupled to the first processing zone and comprising a third acid gas removal unit to receive the permeate stream from the first processing zone and remove a majority of the acid gas from the permeate stream, thereby yielding a second acid gas rich stream and a helium rich stream, wherein concentration of acid gas in the second acid gas rich stream is greater than concentration of acid gas in the helium rich stream, and wherein the third acid gas removal unit does not comprise pressure swing adsorption.

12. The system of claim 11, wherein the first acid gas removal unit comprises an acid gas removal membrane, wherein permeance of the acid gas removal membrane for acid gas is greater than permeance of the acid gas removal membrane for hydrocarbon gas, wherein permeance of the acid gas removal membrane for helium is greater than permeance of the acid gas removal membrane for hydrocarbon gas.

13. The system of claim 12, wherein permeance of the acid gas removal membrane for acid gas is greater than permeance of the acid gas removal membrane for nitrogen gas, wherein permeance of the acid gas removal membrane for helium is greater than permeance of the acid gas removal membrane for nitrogen gas.

14. The system of claim 11, wherein the second acid gas removal unit and the third acid gas removal unit each independently comprises a liquid-based absorption process unit, a molecular centrifuge unit, or a temperature swing adsorption process unit.

15. The system of claim 14, wherein the third acid gas removal unit comprises the liquid-based absorption process unit comprising an amine absorption process unit, a hot potassium absorption process unit, a mixed solvent absorption process unit, or a physical solvent absorption unit.

16. The system of claim 11, wherein the second acid gas removal unit does not comprise an acid gas removal membrane.

17. The system of claim 11, comprising a sulfur removal unit fluidly coupled to the third acid gas removal unit to receive the second acid gas rich stream and remove hydrogen sulfide from the second acid gas rich stream.

18. The system of claim 11, wherein the third acid gas removal unit comprises a liquid-based absorption process unit comprising an amine absorption process unit, a hot potassium absorption process unit, a mixed solvent absorption process unit, or a physical solvent absorption unit.

19. The system of claim 11, comprising a sulfur removal unit fluidly coupled to the third acid gas removal unit to receive the second acid gas rich stream to oxidize hydrogen sulfide and react hydrogen sulfide and sulfur dioxide to yield sulfur.

20. The system of claim 11, wherein the third processing zone comprises a dehydration unit fluidly coupled to the third acid gas removal unit to remove water from the helium rich stream, thereby yielding a dehydrated helium rich stream and a water stream.

21. The system of claim 20, comprising a helium purification unit to receive and process the dehydrated helium rich stream to yield a helium product stream comprising a concentration of helium of at least 80 mol %.

22. The system of claim 11, comprising a helium purification unit fluidly coupled to the third acid gas removal unit to receive and process the helium rich stream to yield a helium product stream comprising a concentration of helium of at least 80 mol %.

23. The system of claim 22, wherein the helium purification unit comprises a helium absorption unit, a helium adsorption unit, a molecular centrifuge unit, or a helium distillation unit.

24. The system of claim 23, wherein the helium adsorption unit comprises a molecular sieve, a pressure swing adsorption unit, or a temperature swing adsorption unit.

25. The system of claim 23, wherein the helium distillation unit comprises a cryogenic distillation unit.

* * * * *